US011875070B2

(12) United States Patent
Ogata (10) Patent No.: US 11,875,070 B2
(45) Date of Patent: Jan. 16, 2024

(54) INFORMATION PROCESSING APPARATUS

(71) Applicant: SHARP KABUSHIKI KAISHA, Sakai (JP)

(72) Inventor: Yoshitaka Ogata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/948,248

(22) Filed: Sep. 20, 2022

(65) Prior Publication Data

US 2023/0122023 A1 Apr. 20, 2023

(30) Foreign Application Priority Data

Oct. 15, 2021 (JP) ................. 2021-169564

(51) Int. Cl.
*G06F 3/12* (2006.01)
(52) U.S. Cl.
CPC .......... *G06F 3/1225* (2013.01); *G06F 3/1205* (2013.01); *G06F 3/1238* (2013.01)
(58) Field of Classification Search
CPC .... G06F 3/1225; G06F 3/1205; G06F 3/1238; G06F 3/12; G06F 3/1204; G06F 3/1222; G06F 3/1285; G06F 3/1288
See application file for complete search history.

(56) References Cited

U.S. PATENT DOCUMENTS

| 11,003,402 | B2* | 5/2021 | Yada | G06F 3/04847 |
| 2012/0069385 | A1* | 3/2012 | Von Hatten | G06F 3/1224 |
| | | | | 358/1.15 |
| 2012/0099149 | A1* | 4/2012 | Inoue | G06F 3/1267 |
| | | | | 358/1.15 |
| 2015/0317108 | A1* | 11/2015 | Hadano | G06F 3/1287 |
| | | | | 358/1.15 |
| 2019/0340015 | A1* | 11/2019 | Saigusa | G06F 9/4411 |
| 2019/0349482 | A1* | 11/2019 | Iwasawa | H04N 1/0048 |
| 2019/0379800 | A1* | 12/2019 | Kogure | H04N 1/00965 |
| 2021/0279016 | A1* | 9/2021 | Kikuchi | G06F 3/1205 |
| 2022/0300228 | A1* | 9/2022 | Narita | G06F 3/1285 |
| 2022/0317947 | A1* | 10/2022 | Shiraga | G06F 3/1224 |

FOREIGN PATENT DOCUMENTS

JP 2006-093771 A 4/2006

* cited by examiner

*Primary Examiner* — Helen Zong
(74) *Attorney, Agent, or Firm* — ScienBiziP, P.C.

(57) ABSTRACT

An information processing apparatus, including a storage having a registry area capable of referring to print setting of a plurality of printer drivers, an operation acceptor which accepts inputs of various instructions from a user; a communicator which transmits print data to the image forming device on the basis of the print setting of the printer driver; and a controller which controls the storage, the operation acceptor, and the communicator, in which master data including authentication information can be registered in the registry area, when the operation acceptor accepts an input of a print instruction, the controller refers to the master data and, when the authentication information for authentication print is set, the controller causes the authentication information to be reflected in the print setting of the printer driver and causes the printer driver to generate print data and to transmit the print data to the communicator.

3 Claims, 10 Drawing Sheets

| HKEY_CURRENT_USER | NAME | TYPE | DATA |
|---|---|---|---|
| SOFTWARE | ID | REG_BINARY | 00 01 02 00 ··· |
| SAHRP | Password | REG_BINARY | 00 04 04 05 ··· |
|   Authentication | SHARP MX-AAAA PCL6 | REG_STRING | |
|     GroupA | SHARP MX-BBBB PCL6 | REG_STRING | |
|     GroupB | | | |
|     GroupC | | | |

FIG. 4B

| HKEY_CURRENT_USER | NAME | TYPE | DATA |
|---|---|---|---|
| SOFTWARE | ID | REG_BINARY | 00 01 02 00 ··· |
| SAHRP | Password | REG_BINARY | 00 05 06 07 ··· |
|   Authentication | SHARP MX-CCCC PCL6 | REG_STRING | |
|     GroupA | SHARP MX-DDDD PCL6 | REG_STRING | |
|     GroupB | | | |
|     GroupC | | | |

FIG. 4C

| HKEY_CURRENT_USER | NAME | TYPE | DATA |
|---|---|---|---|
| SOFTWARE | UserNumber | REG_BINARY | 00 01 02 03 ··· |
| SAHRP | SHARP MX-EEEE PCL6 | REG_STRING | |
|   Authentication | | | |
|     GroupA | | | |
|     GroupB | | | |
|     GroupC | | | |

AUTHENTICATION INFORMATION SAVING

AUTHENTICATION SETTING HAS BEEN CHANGED.
SAVE IT IN MASTER?

CATEGORY: GroupA

YES    NO

FIG. 10

INFORMATION PROCESSING APPARATUS

BACKGROUND OF THE INVENTION

Field of the Invention

This disclosure relates to an information processing apparatus, and more specifically, to an information processing apparatus in which a plurality of printer drivers corresponding to a plurality of image forming devices are installed.

Description of the Background Art

In general, in order to control an image forming device such as a printer or a multifunction machine connected to a terminal device such as a PC (personal computer) from a terminal device, a printer driver, which is software to control the image forming device, needs to be installed in the terminal device.

Thus, when a plurality of the image forming devices are to be connected to a terminal device, the printer drivers in the number of the image forming devices to be connected need to be installed in the terminal devices.

Regarding the printer driver as above, such an art is known that, in order to reduce labor of users to set print conditions for each print, users' preferred print conditions are set in advance, and the settings are reflected in a setting dialog box at time of printing.

However, when the plurality of printer drivers are installed in a single terminal device as described above, the print conditions need to be set for each printer driver, which is not very convenient for the users.

In order to solve the problems as above, such a content is disclosed that, when a different printer driver is installed in the terminal device in which a printer driver that controls an image forming device has been installed, the settings of the printer driver already installed are reflected in the settings of the newly installed printer driver.

However, since the conventional disclosure reflects the settings only when a new printer driver is installed, there is a problem that the setting information (authentication information such as passwords for authentication settings, for example) that may change during long-term use cannot be shared by the plurality of printer drivers, even if the sharing is needed.

This disclosure was made in consideration of the circumstances as above, and an object thereof is to provide an information processing apparatus in which the change of setting information is shared by the plurality of printer drivers, even when the setting information is changed after a plurality of printer drivers corresponding to the plurality of image forming devices are installed.

SUMMARY OF THE INVENTION (1) An information processing apparatus according to this disclosure includes a storage having a registry area capable of referring to print setting of a plurality of printer drivers corresponding to a plurality of external image forming devices, respectively, an operation acceptor which accepts inputs of various instructions from a user, a communicator which transmits print data to the image forming device corresponding to the printer driver on the basis of the print setting of the printer driver, and a controller which controls the storage, the operation acceptor, and the communicator, in which master data including authentication information for authentication print of the plurality of image forming devices can be registered in the registry area, when the operation acceptor accepts an input of a print instruction to the image forming device, the controller refers to the master data and, when the authentication information for authentication print of the image forming device is set, causes the authentication information to be reflected in the print setting of the printer driver and causes the printer driver to generate print data based on the print instruction and to transmit the print data to the communicator.

According to this disclosure, even if the setting information is changed after the plurality of printer drivers corresponding to the plurality of image forming devices have been installed, the information processing apparatus in which the setting information is shared by the plurality of printer drivers can be realized.

BRIEF DESCRIPTION OF THE DRAWINGS

FIGS. 4A, 4B, and 4C are examples of setting data of master authentication-information registration tool for the print setting of the digital multifunction machine shown in FIG. 1.

FIGS. 5A, 5B, and 5C are examples of a setting screen of the master authentication-information registration tool for the print setting of the digital multifunction machine shown in FIG. 1.

DESCRIPTION OF THE PREFERRED EMBODIMENTS

In this disclosure, "the image forming device" is a device that forms an image and outputs it, including a copying machine or a multifunction machine having a copying (copy function) function such as a printer using an electrophotographic method for image forming with toner, an MFP (Multifunctional Peripheral: multifunctional peripheral device) that also includes functions other than copying and the like.

The "plurality of printer drivers corresponding to the plurality of image forming devices" are a plurality of pieces of software pre-installed in the information processing apparatus in order to control print instructions to the plurality of image forming devices.

The "print data" refers to image data and print setting data thereof that should be transmitted to the image forming device for printing.

The "information processing apparatus" is not limited to personal computers (PCs), but can also include portable information terminals such as smartphones and tablet terminals, electronic blackboards, information displays and the like.

Subsequently, preferred modes of this disclosure will be described.

(2) In the information processing apparatus according to this disclosure, it may be so configured that an authentication-information setter for authentication print of the image forming device is further provided, the authentication-information setter classifies the plurality of image forming devices to arbitrary affiliation groups and registers the authentication information for each affiliation group, and when the operation acceptor accepts an input of a print instruction to the image forming device, the controller determines the affiliation group of the image forming device by referring to the master data, and when authentication information for authentication print corresponding to the determined affiliation group is set, it causes the authentication information to be reflected in print setting of the printer driver, and print data based on the print instruction to be generated and transmitted to the communicator.

The "authentication-information setter for authentication print of the image forming device" is a setting tool installed to collectively manage the authentication information for print setting in the plurality of printer drivers.

In this way, even when the setting information is to be changed after the plurality of printer drivers corresponding to the plurality of image forming devices have been installed, the information processing apparatus in which the setting information is shared by the plurality of printer drivers for each predetermined affiliation group can be realized.

(3) In the information processing apparatus in this disclosure, it may be so configured that a display which displays a print setting screen of the plurality of image forming devices to the user is further provided, the display displays new registration or update of the authentication information for authentication print of the image forming device on the print setting screen to be able to accept the new registration or update, and when the operation acceptor accepts an input of a new registration or update instruction of the authentication information for authentication print of the image forming device, the controller causes the authentication information to be reflected in the print setting of the printer driver.

In this way, even when the setting information is to be changed after the plurality of printer drivers corresponding to the plurality of image forming devices have been installed, the information processing apparatus in which the latest setting information is shared by the plurality of printer drivers at all times can be realized.

(4) In the information processing apparatus according to this disclosure, it may be so configured that, when the operation acceptor accepts the input of the new registration or update instruction of the authentication information for authentication print of the image forming device, the controller causes a predetermined confirmation message to be displayed on the display.

In this way, when the setting information is to be changed after the plurality of printer drivers corresponding to the plurality of image forming devices have been installed, the confirmation message is displayed and thus, the information processing apparatus with high convenience for users can be realized.

Hereinafter, this disclosure will be described in more detail with reference to the drawings. The following description is exemplification in all respects and should not be construed to limit the present disclosure.

Embodiment 1

Schematic Configuration of Image Forming System 100

On the basis of FIG. 1, a configuration of an image forming system 100 including a PC2 as an example of the information processing apparatus of this disclosure will be described.

The information processing apparatus is not limited to a personal computer, but can be any device as long as a printer driver can be installed, and print instructions can be given to the digital multifunction machine 1, such as a portable information terminal including a smartphone, a tablet terminal or the like, an electronic blackboard, an information display or the like, for example.

Figure 1:
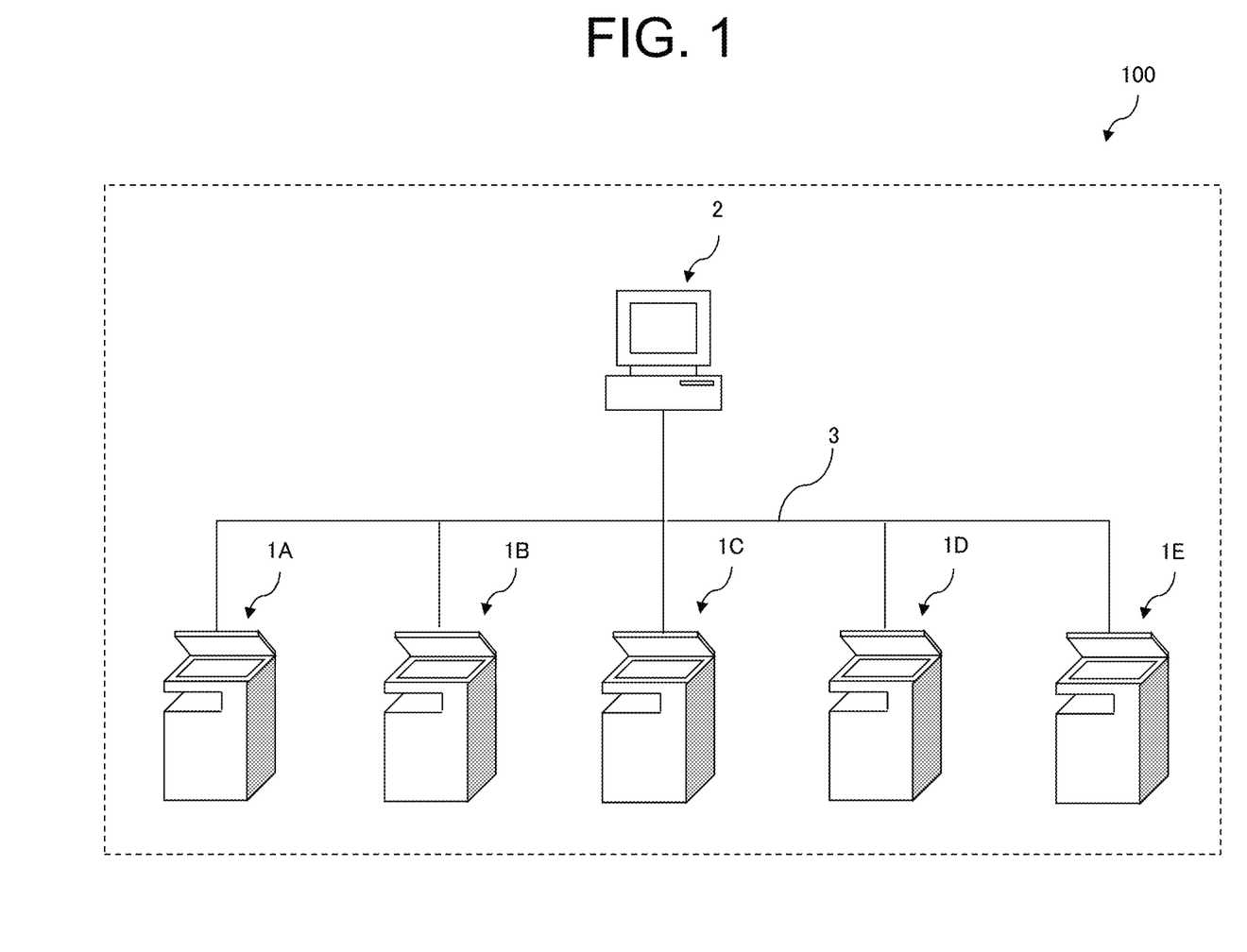
FIG. 1 is an explanatory diagram illustrating a schematic configuration of an image forming system 100 that includes a PC and a digital multifunction machine of this disclosure.

FIG. 1 is an explanatory diagram illustrating the schematic configuration of the image forming system 100 including the PC2 and digital multifunction machines 1A, 1B, 1C, 1D, and 1E of this disclosure.

In the following description, the digital multifunction machines 1A, 1B, 1C, 1D, and 1E are collectively called a digital multifunction machine 1. The configuration in FIG. 1 is only an example, and the image forming system 100 may include any number of digital multifunction machines 1.

As shown in FIG. 1, the image forming system 100 is constituted by the digital multifunction machines 1A, 1B, 1C, 1D, 1E, the PC 2, and a network 3.

The digital multifunction machine 1 is a device such as an MFP (Multifunction Peripheral: multifunctional peripheral device) that digitally processes image data and has a copy function, a printer function, a scanner function, and a facsimile function.

The PC2 transmits the image data to the digital multifunction machine 1 via the network 3 so as to have jobs such as printing executed.

Schematic Configuration of Digital Multifunction Machine 1

Next, a schematic configuration of the digital multifunction machine 1 will be described with reference to FIG. 2.

Figure 2:
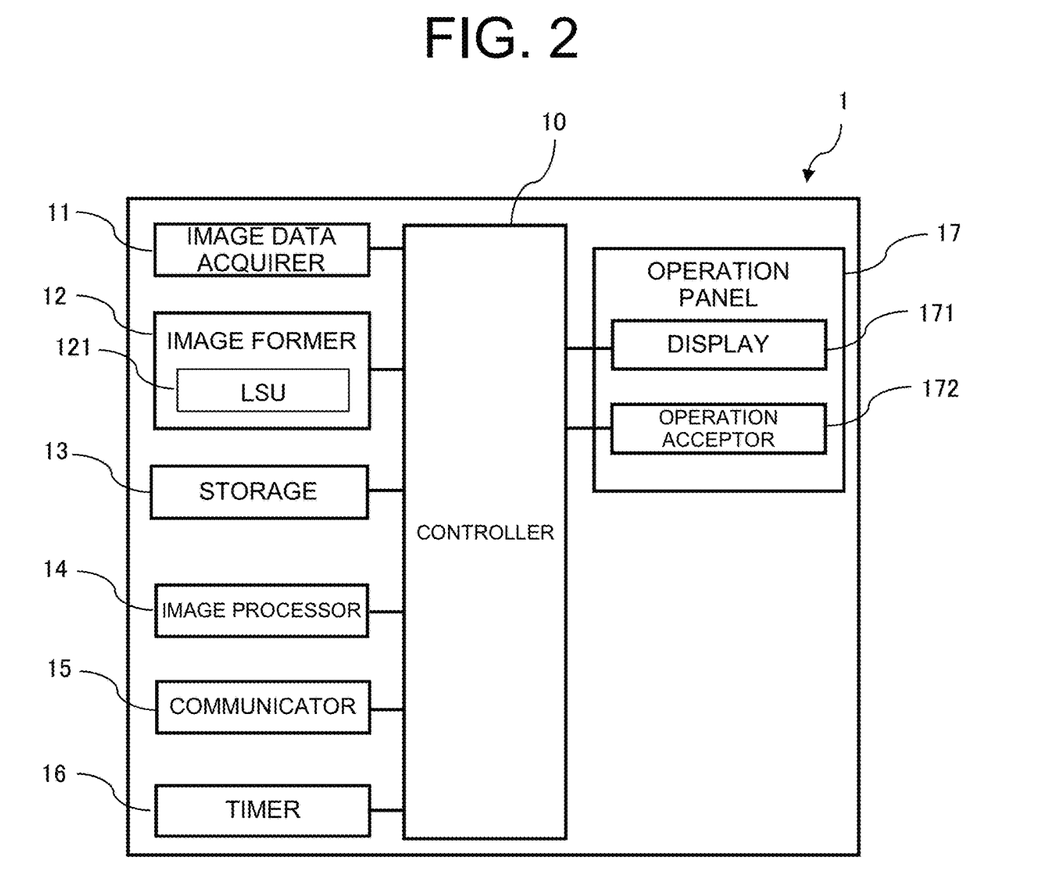
FIG. 2 is a block diagram illustrating a schematic configuration of the digital multifunction machine shown in FIG. 1.

FIG. 2 is a block diagram illustrating a schematic configuration of the digital multifunction machine 1 shown in FIG. 1.

As shown in FIG. 2, the digital multifunction machine 1 of this disclosure includes a controller 10, an image-data acquirer 11, an image former 12, a storage 13, an image processor 14, a communicator 15, a timer 16, and an operation panel 17.

In the following, each constituent element of the digital multifunction machine 1 will be described.

The controller 10 comprehensively controls the digital multifunction machine 1, and is constituted by a CPU, a RAM, a ROM, various interface circuits and the like.

The controller 10 performs detection of each sensor and monitoring/control of all loads such as a motor, a clutch, the operation panel 17 and the like in order to control an entire operation of the digital multifunction machine 1.

The image-data acquirer 11 is a portion that acquires image data generated by an external information processing device such as the PC2, a facsimile device (not shown) and the like.

The image former 12 is a portion that prints and outputs, on paper, image data acquired by the image-data acquirer 11 and processed by the image processor 14, and includes an LSU 121.

The LSU 121 is a device that forms an electrostatic latent image by emitting a laser beam corresponding to information of the image data constituted by digital signals onto a surface of a photosensitive drum (not shown) in a charged state.

The storage 13 is an element or a storage medium that stores information, control programs and the like required to realize the various functions of the digital multifunction machine 1. For example, a semiconductor device such as a RAM, a ROM and the like or a storage medium such as a hard disk, a flash storage, an SSD and the like is used.

The storage 13 stores data required for execution of jobs such as information on a job of printing and the like, image data and the like. The storage 13 also stores information such as a login name and a password of the user and the like stored for user authentication.

Note that, a program and data may be held in different devices in such a way that a data holding area is constituted by a hard disk drive, and a program holding area is constituted by a flash memory.

The image processor 14 is a portion that converts the image data input from the image-data acquirer 11 to an appropriate electric signal on the basis of an analysis result of job instructions on printing and the like acquired from the PC2 and the like through the communicator 15 and processes the data to make it suitable for output, such as enlargement, reduction and the like.

The communicator 15 is a portion which communicates with the external PC2 via the network 3 so as to obtain the job instructions on the printing and the like and document image data and the like.

The communicator 15 is also a portion that communicates with the PC2, other image forming devices, the portable information terminals, the information processing devices, the facsimile devices and the like and transmits and receives various types of information such as e-mails, faxes and the like to and from these external devices.

The timer 17 is a portion that measures and counts time and acquires time through a built-in clock or the network 3, for example.

The operation panel 17 is constituted by a display panel constituted by a liquid crystal panel or the like and a touch panel such as a capacitive touch panel that is placed over the display panel and detects a position touched by a finger, and the operation panel 17 includes a display 171 and an operation acceptor 172.

The display 171 is a portion that displays various types of information.

The display 171 is constituted by a CRT display, a liquid crystal display, an EL display or the like, for example, and is a display device such as a monitor, a line display or the like for an operating system or application software to display electronic data such as a processing state.

The controller 10 displays, through the display 171, an operation and a state of the digital multifunction machine 1.

The operation acceptor 172 is an interface for operating the digital multifunction machine 1, and is a portion that accepts an instruction from a user.

Schematic Configuration of PC2

Next, a schematic configuration of the PC2 will be described with reference to FIG. 3.

Figure 3:
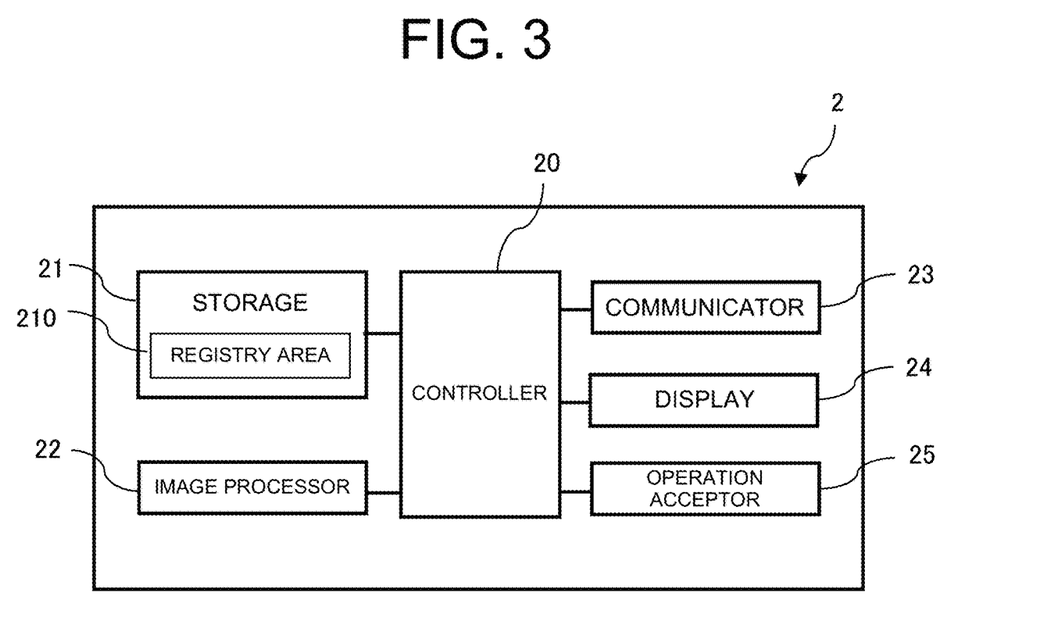
FIG. 3 is a block diagram illustrating a schematic configuration of the PC shown in FIG. 1.

FIG. 3 is a block diagram illustrating the schematic configuration of the PC2 shown in FIG. 1.

As shown in FIG. 3, the PC2 includes a controller 20, a storage 21, an image processor 22, a communicator 23, a display 24, and an operation acceptor 25.

The controller 20 comprehensively controls the PC2 and is constituted by a CPU, a RAM, a ROM, various interface circuits and the like.

The storage 21 is an element or a storage medium that stores information, control programs and the like required to realize various functions of the PC2. For example, a semiconductor device such as a RAM, a ROM and the like or a storage medium such as a hard disk, a flash storage, an SSD and the like is used.

The storage 21 includes a registry area 210 that can be referred to by a plurality of printer drivers corresponding to the plurality of digital multifunction machines 1.

In the registry area 210, master data including authentication information such as user login names and passwords is registered for the authentication print.

The image processor 22 is a portion that converts image data into an appropriate electric signal and processes it to make it suitable for output, such as enlargement, reduction and the like.

The communicator 23 is a portion that communicates with the external digital multifunction machine 1 via the network 3 so as to transmit the job instructions on the printing and the like and document image data and the like.

The display 24 is a portion that displays various types of information.

The display 24 is constituted by, for example, a CRT display, a liquid crystal display, an EL display or the like and is a display device such as a monitor, a line display or the like for an operating system or application software to display electronic data such as a processing state.

The controller 20 displays, through the display 24, an operation and a state of the PC2.

The operation acceptor 25 is an interface for operating the PC2, and is a portion that accepts an instruction from a user.

The operation acceptor 25 is constituted by an array of a plurality of keys. It may also have a touch panel similarly to the digital multifunction machine 1.

Example of Setting of Master
Authentication-Information

Registration Tool for Print Setting of Digital Multifunction Machine 1 Next, on the basis of FIGS. 4A, 4B, and 4C and FIGS. 5A, 5B, and 5C, an example of setting of the master authentication-information registration tool for the print setting of the digital multifunction machine 1 of this disclosure will be described.

Figure 4A:
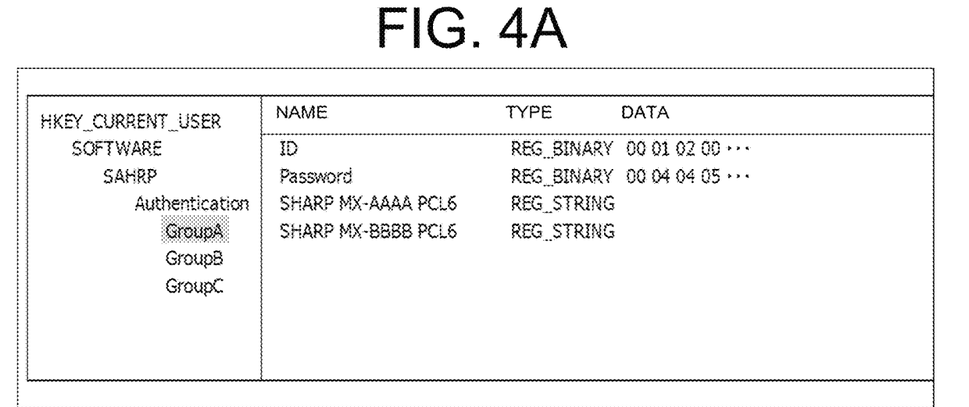
FIG. 4A shows an example of the setting data for an affiliation category GroupA.
Figure 4B:
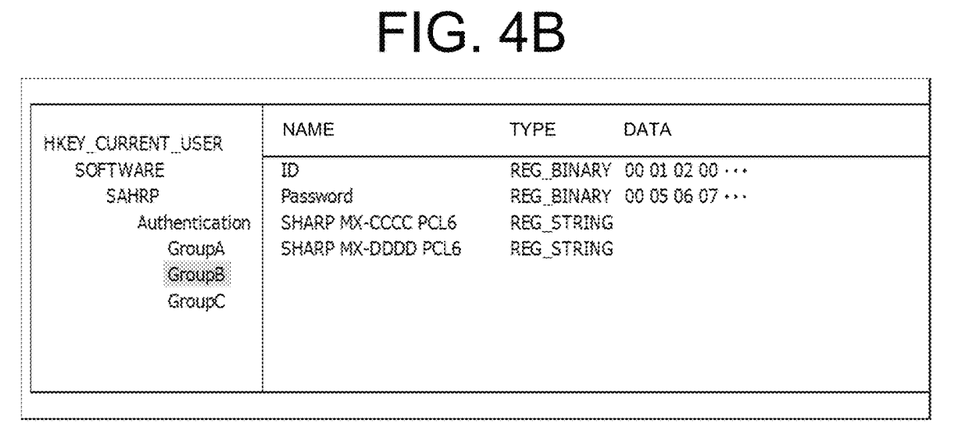
FIG. 4B shows an example of the setting data for an affiliation category GroupB.
Figure 4C:
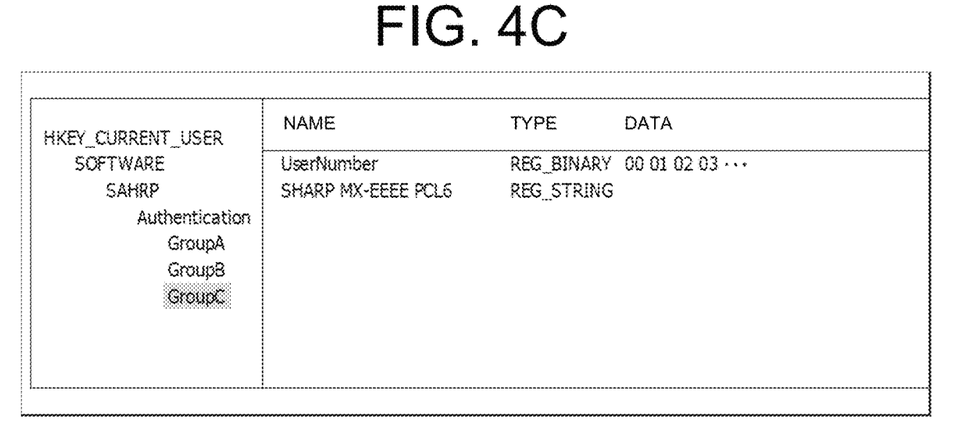
FIG. 4C shows an example of the setting data for an affiliation category Group C.

FIGS. 4A, 4B, and 4C are examples of setting data for the master authentication-information registration tool for the print setting of the digital multifunction machine 1 shown in FIG. 1. FIG. 4A shows an example of the setting data for an affiliation category GroupA, FIG. 4B shows an example of the setting data for an affiliation category GroupB, and FIG. 4C shows an example of the setting data for an affiliation category GroupC.

In the example in FIG. 4A, the "GroupA" is selected and two units, that is, the digital multifunction machine 1A (SHARP MX-AAAA PCL6) and the digital multifunction machine 1B (SHARP MX-BBBB PCL6) are set. And the authentication information of the GroupA is set with an ID type "REG_BINARY", data "00 01 02 00 . . . ", a password type "REG_BINARY" and data "00 04 04 05 . . . ".

In the example in FIG. 4B, the "GroupB" is selected and two units, that is, the digital multifunction machine 1C (SHARP MX-CCCC PCL6) and the digital multifunction machine 1D (SHARP MX-DDDD PCL6) are set. The authentication information of the GroupB is set with the ID type "REG_BINARY" and the data "00 01 02 00 . . . ", the password type "REG_BINARY", and the data "00 05 06 07 . . . ".

In the example in FIG. 4C, the "GroupC" is selected and one unit of the digital multifunction machine 1E (SHARP MX-EEEE PCL6) is set. In addition, the authentication information of the GroupC is set with the type of UserNumber "REG_BINARY" and the data "00 01 02 03 . . . ".

Figure 5A:
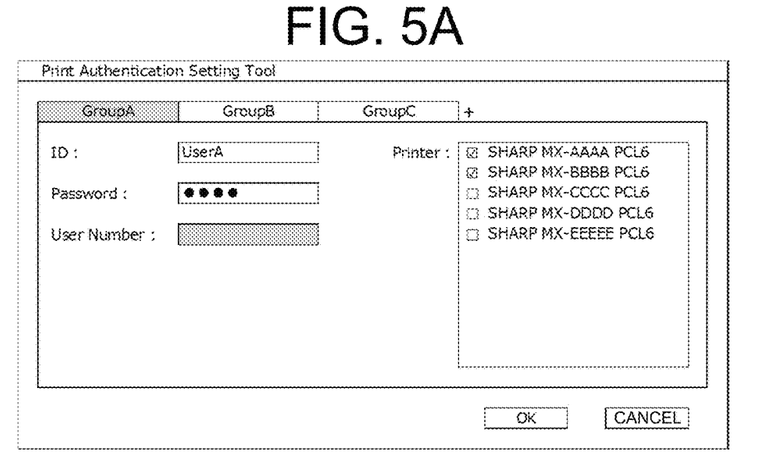
FIG. 5A shows an example of the setting for the affiliation category GroupA.
Figure 5B:
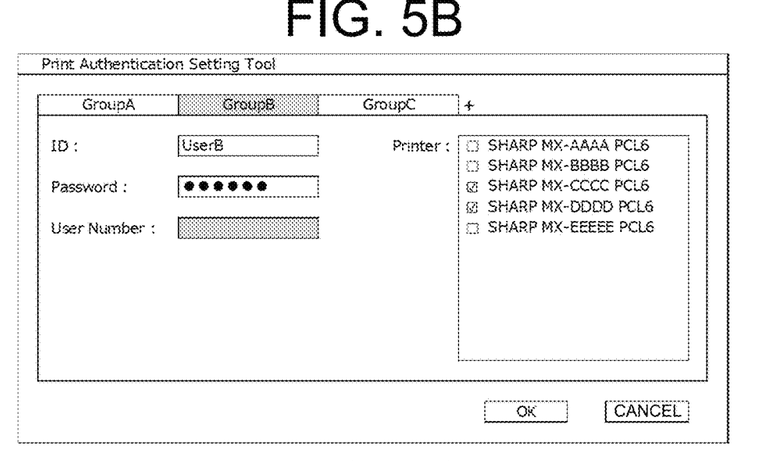
FIG. 5B shows an example of the setting for the affiliation category GroupB.
Figure 5C:
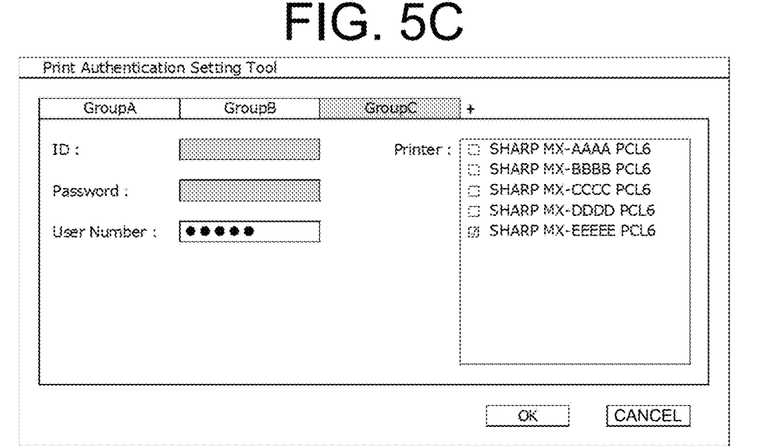
FIG. 5C shows an example of the setting for the affiliation category GroupC.

FIGS. 5A, 5B, and 5C are examples of the master authentication-information registration tool setting screen for the print setting of the digital multifunction machine 1 shown in FIG. 1. FIG. 5A shows an example of the setting for the affiliation category GroupA, FIG. 5B shows an example of the setting for the affiliation category GroupB, and FIG. 5C shows an example of the setting for the affiliation category GroupC.

In the example in FIG. 5A, a tab of the "GroupA" is selected and two units, that is, the digital multifunction machine 1A (SHARP MX-AAAA PCL6) and the digital multifunction machine 1B (SHARP MX-BBBB PCL6) are selected as printers.

And the authentication information of the GroupA is set with the ID "UserA" and the password set in cipher input.

In the example in FIG. 5B, the tab of the "GroupB" is selected, and two units, that is, the digital multifunction machines 1C (SHARP MX-CCCC PCL6) and the digital multifunction machine 1D (SHARP MX-DDDD PCL6) are selected.

The authentication information of the GroupB is set with the ID type "REG_BINARY", the data "00 01 02 00 . . . ", the password type "UserB", and the password set in cipher input.

In the example in FIG. 5C, the tab of the "GroupC" is selected and one unit of the digital multifunction machine 1E (SHARP MX-EEEE PCL6) is selected.

And the authentication information of the GroupC is set with the UserNumber set in cipher input.

Procedure for Processing of Reflecting Authentication Information from Print Setting Screen at Printing by Digital Multifunction Machine 1 Next, on the basis of FIG. 6, a procedure for processing of reflecting authentication information when the print setting screen is opened at printing by the digital multifunction machine 1 in this disclosure will be explained.

Figure 6:
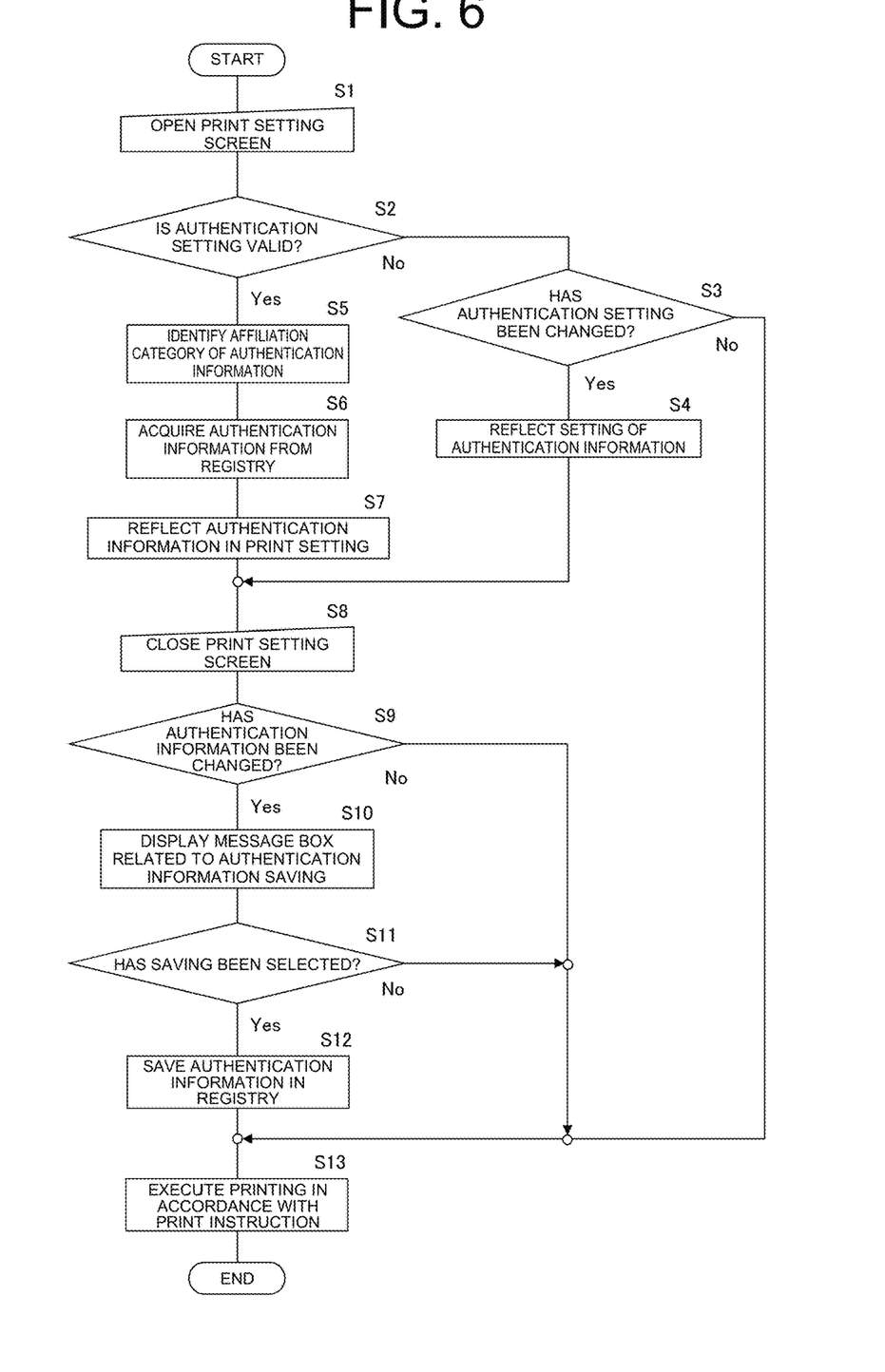
FIG. 6 is a flowchart illustrating an outline of a procedure for reflecting authentication information when the print setting screen is opened during printing by the digital multifunction machine shown in FIG. 1.

FIG. 6 is a flowchart illustrating an outline of the procedure for reflecting the authentication information when the print setting screen is opened at printing by the digital multifunction machine 1 shown in FIG. 1.

In FIG. 6, it is assumed that the user opens the print setting screen and executes printing.

At Step S1 in FIG. 6, when the user opens the print setting screen of the digital multifunction machine 1 (Step S1), at Step S2, the controller 10 determines whether the authentication setting is valid or not (Step S2).

Figure 7:
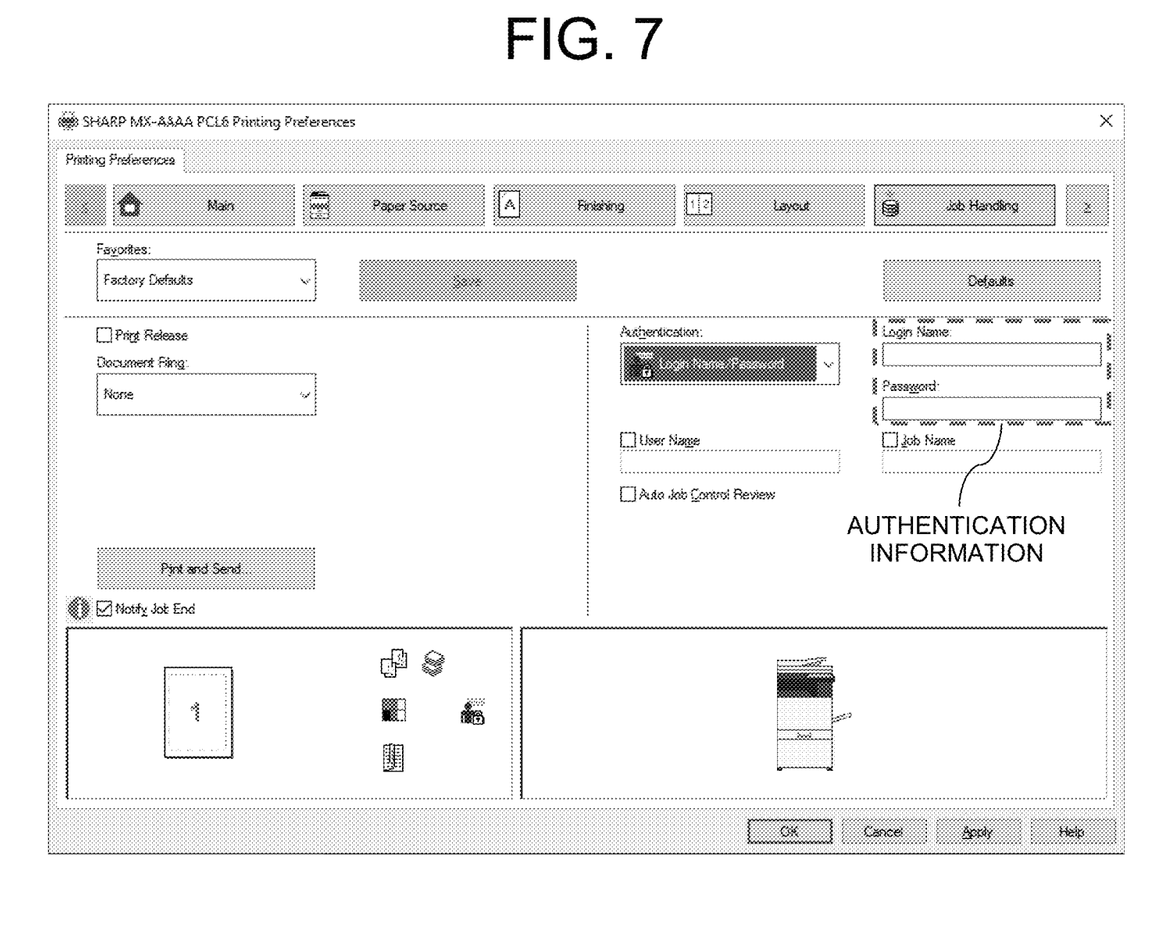
FIG. 7 is an example of display when the authentication information on the print setting screen of the digital multifunction machine shown in FIG. 1 is valid.
Figure 8:
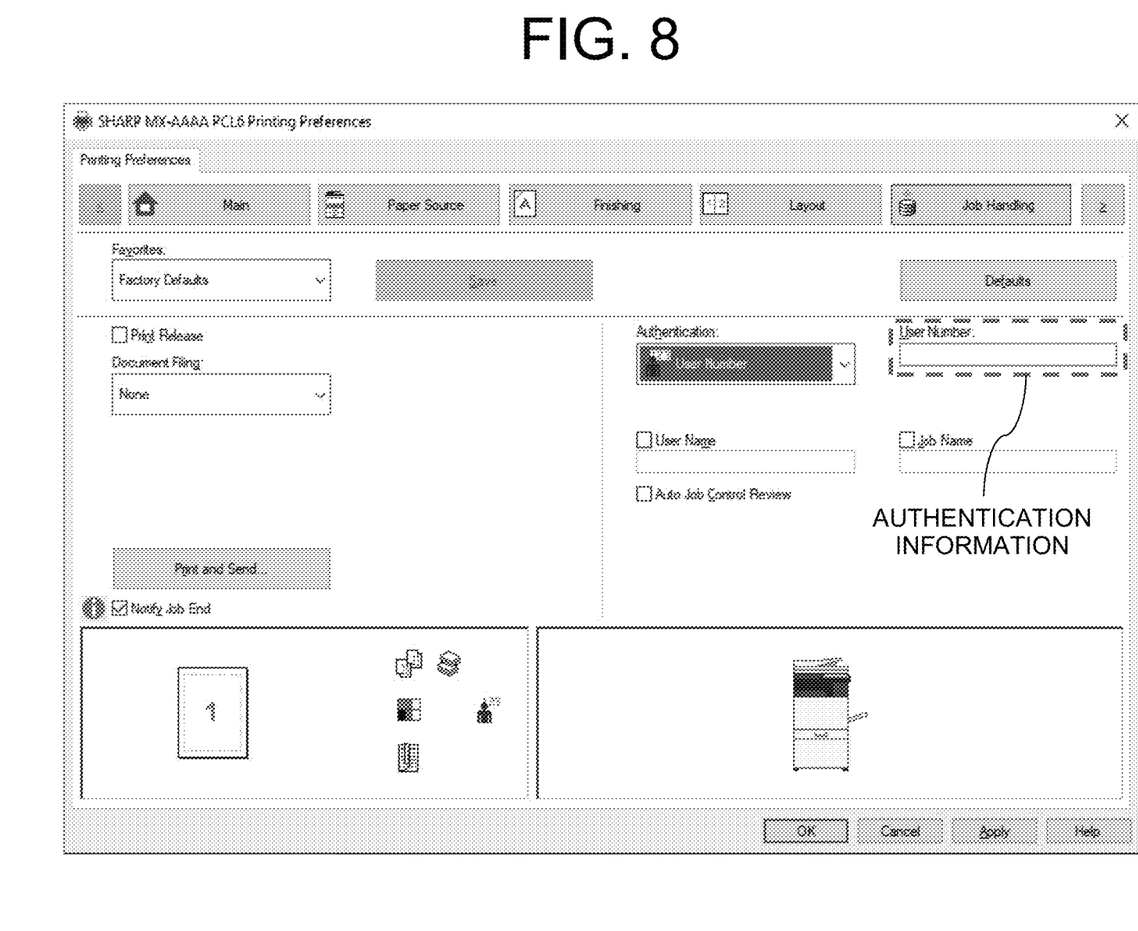
FIG. 8 is an example of the display when the authentication information on the print setting screen of the digital multifunction machine shown in FIG. 1 is valid.

FIGS. 7 and 8 are examples of display when the authentication information on the print setting screen of the digital multifunction machine 1 shown in FIG. 1 is valid.

When the authentication information is valid, input forms for a "Login Name" and a "Password" are displayed on the print setting screen, as shown in FIG. 7.

Alternatively, as shown in FIG. 8, an input form for a "Login Number" is displayed on the print setting screen.

If the authentication information is not valid, such input forms as above will not be displayed, in which case a button or the like may be displayed to accept changes in the authentication settings.

At Step S2 in FIG. 6, if the authentication setting is not valid (when the determination at Step S2 is No), at Step S3, the controller 10 determines whether the authentication setting has been changed or not (Step S3).

If the authentication setting has been changed (when the determination at Step S3 is Yes), at Step S4, the controller 10 causes the authentication information setting to be reflected (Step S4).

At the subsequent Step S8, if the user closes the print setting screen (Step S8), the controller 10 executes determination at Step S9.

On the other hand, if the authentication setting has not been changed (when the determination at Step S3 is No), at Step S13, the controller 10 executes printing in accordance with the user's print instruction (Step S13).

At Step S2, if the authentication setting is valid (when the determination at Step S2 is Yes), at Step S5, the controller 10 identifies the affiliation category of the authentication setting (Step S5).

For example, if the digital multifunction machine 1 specified in the print setting is the digital multifunction machine 1A (SHARP MX-AAAA PCL6), it belongs to the affiliation category GroupA as shown in the setting data in FIG. 4A.

Next, at Step S6, the controller 10 acquires the authentication information from the registry (Step S6), and at the subsequent Step S7, the authentication information is caused to be reflected in the print setting (Step S7).

Next, at Step S8, after the user closes the print setting screen (Step S8), at the subsequent Step S9, the controller 10 determines whether the authentication information has been changed or not (Step S9).

If the authentication information has not been changed (when the determination at Step S9 is No), at Step S13, the controller 10 executes printing in accordance with the user's print instruction.

On the other hand, if the authentication information has been changed (when the determination at Step S9 is Yes), at Step S10, the controller 10 displays a message box related to saving of the authentication information on the display 171 (Step S10).

Figure 9:
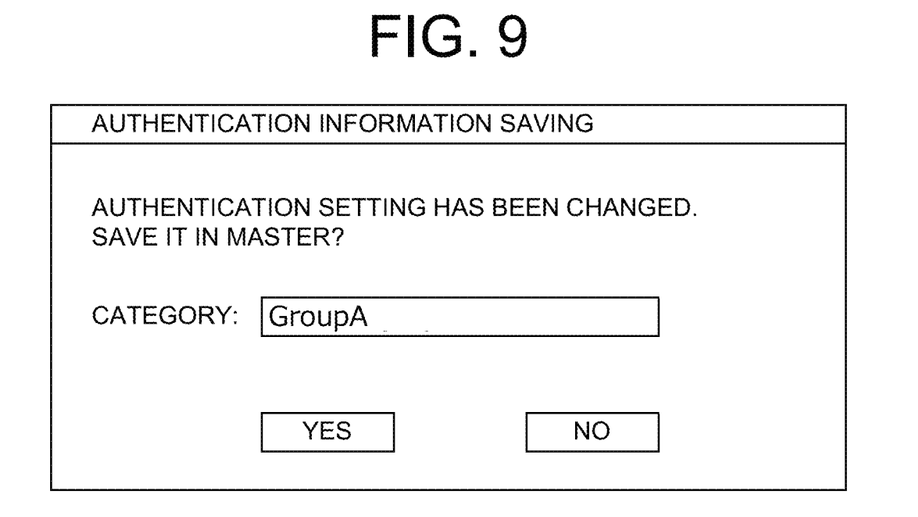
FIG. 9 is an example of a message box regarding saving of the authentication information of the digital multifunction machine shown in FIG. 1.

FIG. 9 is an example of the message box related to the saving of the authentication information for the digital multifunction machine 1 shown in FIG. 1.

In the example in FIG. 9, after a message that the "Authentication setting was changed. Do you want to save it in the master?", the affiliation category "GroupA" is displayed.

Note that, in the case of new registration, the input form for the affiliation category is displayed as blank, and the user needs to enter an arbitrary name.

On the other hand, in the case of update, the affiliation category input at the time of new registration is displayed.

The user selects "Yes" when the change in the authentication setting is to be saved in the master, or "No" when it is not to be saved.

Next, at Step S11 in FIG. 6, the controller 10 determines whether the saving has been selected or not (Step S11).

If the saving has not bee selected (when the determination at Step S11 is No), at Step S13, the controller 10 executes printing in accordance with the user's print instruction.

On the other hand, if the saving has been selected (when the determination at Step S11 is Yes), at Step S12, the controller 10 saves the authentication information in the registry (Step S12).

Then, at Step S13, the controller 10 executes printing in accordance with the user's print instruction.

In this way, even when the setting information is to be changed after the printer driver has been installed, the digital multifunction machine 1 in which the change of the setting information is shared by the plurality of printer drivers can be realized.

Embodiment 2

Next, on the basis of FIG. 10, the procedure of processing for reflecting the authentication information when the print setting screen is not opened at printing by the digital multifunction machine 1 of Embodiment 2 of this disclosure will be described.

Figure 10:
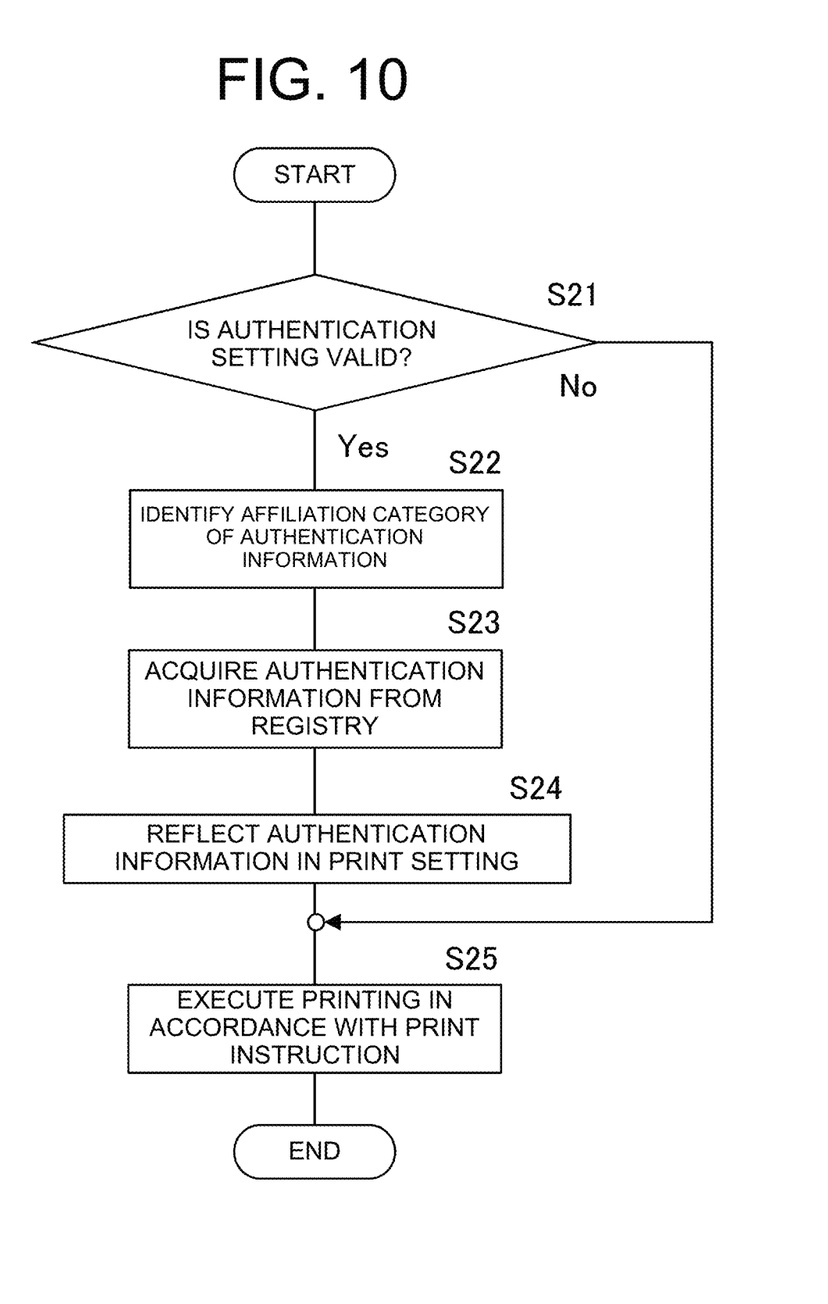
FIG. 10 is a flowchart illustrating an outline of a procedure for reflecting the authentication information when the print setting screen is not opened during printing by the digital multifunction machine in Embodiment 2 of this disclosure.

FIG. 10 is a flowchart illustrating an outline of the procedure for reflecting the authentication information when the print setting screen is not opened at printing by the digital multifunction machine 1 in Embodiment 2 of this disclosure.

In FIG. 10, such a case is assumed that the user executes printing without opening the print setting screen.

At Step S21 in FIG. 10, the controller 10 determines whether the authentication setting is valid or not (Step S21).

If the authentication setting is not valid (when the determination at Step S21 is No), at Step S25, the controller 10 executes printing in accordance with the user's print instruction (Step S25).

On the other hand, if the authentication setting is valid (when the determination at Step S21 is Yes), at Step S22, the controller 10 identifies the affiliation category of the authentication setting (Step S22).

Next, at Step S23, the controller 10 acquires the authentication information from the registry (Step S23), and at the subsequent Step S24, the authentication information is caused to be reflected in the print setting (Step S24).

Then, at Step S25, the controller 10 executes printing in accordance with the user's print instruction.

In this way, when the setting information is valid after the printer driver has been installed, the digital multifunction machine 1 in which the setting information is shared by the plurality of printer drivers without opening the print setting screen at the printing can be realized.

Preferred embodiments of this disclosure also include those obtained by combining any of the plurality of embodiments described above. Apart from the embodiments described above, various modifications are possible about this disclosure. Such modifications should not be construed to fall outside the scope of the present disclosure. This disclosure should embrace the claims and their equivalents, and all modifications within the scope of the claims.

What is claimed is:

1. An information processing apparatus, comprising:
   a storage having a registry area capable of referring to print settings of a plurality of printer drivers each corresponding to one of a plurality of external image forming devices;
   an operation acceptor which accepts inputs of various instructions from a user;
   a communicator which transmits print data to an image forming device of the plurality of image forming devices corresponding to a printer driver of the plurality of printer drivers on a basis of a print setting of the printer driver;
   a controller which controls the storage, the operation acceptor, and the communicator; and
   an authentication-information setter for authentication of the image forming device, wherein
   master data including authentication information for authentication of the plurality of image forming devices is registerable in the registry area,
   when the operation acceptor accepts an input of a print instruction to the image forming device, the controller:
      refers to the master data; and
      if the authentication information for the authentication of the image forming device is set, causes the authentication information to be reflected in the print setting of the printer driver and causes the printer driver to generate print data based on the print instruction and to transmit the print data to the communicator,
   the authentication-information setter classifies the plurality of image forming devices to arbitrary groups and registers the authentication information for each group, and
   when the operation acceptor accepts, on a print setting screen, an input of an instruction to newly register or update the authentication information for the authentication of the image forming device, the controller causes a screen to be displayed, the screen including a target group and a confirmation message for confirming whether to reflect the authentication information.

2. The information processing apparatus according to claim 1, wherein
   when the operation acceptor accepts the input of the print instruction to the image forming device, the controller further determines a group of image forming devices of the plurality of image forming devices by referring to the master data and,
   when authentication information for an authentication corresponding to the determined group is set, the controller further causes the authentication information to be reflected in the print setting of the printer driver and causes print data, based on the print instruction, to be generated and transmitted to the communicator.

3. The information processing apparatus according to claim 1, further comprising:
   a display which displays print setting screens of the plurality of image forming devices, wherein
   the display displays new registration or update of the authentication information for the authentication of the image forming device on the print setting screen to be able to accept the new registration or update, and when the operation acceptor accepts an input of a new registration or update instruction of the authentication information for the authentication of the image forming device, the controller further causes the authentication information to be reflected in the print setting of the printer driver.

\* \* \* \* \*